United States Patent
Gregoire et al.

[11] 3,742,048
[45] June 26, 1973

[54] KERATIN FIBER DYE COMPOUNDS

[75] Inventors: Kalopissis Gregoire, Paris; Bugaut Andree, Boulonge-sur-Seine; Zorayan Vahan, Enghien-les-Bains, all of France

[73] Assignee: L'Oreal, Paris, France

[22] Filed: Oct. 7, 1970

[21] Appl. No.: 78,923

Related U.S. Application Data

[62] Division of Ser. No. 728,750, May 13, 1968, Pat. No. 3,617,164.

[52] U.S. Cl...... 260/562 A, 260/247.1, 260/293.73, 260/247.2 A, 260/471 A, 260/519, 260/397.7, 8/10, 8/10.1
[51] Int. Cl............................................. C07c 103/12
[58] Field of Search............................... 260/562 A Primary Examiner—Alex Mazel
Assistant Examiner—Jose Tovar
Attorney—Cushman, Darby & Cushman

[57] ABSTRACT

A compound of the formula

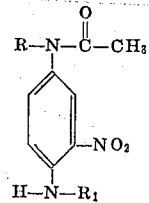

wherein R is selected from the group consisting of lower alkyl, hydroxyalkyl and alkylaminodialkyl, wherein each alkyl moiety has 1–6 carbon atoms and $R_1$ is selected from the group consisting of lower alkyl, lower hydroxyalkyl, lower alkoxyalkyl and

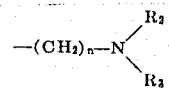

wherein $n$ is 2–6 and $R_2$ and $R_3$ are lower alkyl having 1–6 carbon atoms, and the quaternary ammonium salt thereof, is useful as hair dyes.

3 Claims, No Drawings

KERATIN FIBER DYE COMPOUNDS

This is a divisional application of our copending U.S. Pat. application Ser. No. 728,750, filed May 13, 1968, now U.S. Pat. No. 3,617,164.

It is an object of the present invention to provide a compound of the formula

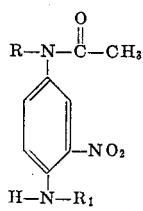

wherein R is selected from the group consisting of lower alkyl, hydroxyalkyl and alkylaminodialkyl, wherein each alkyl moiety has 1–6 carbon atoms and $R_1$ is selected from the group consisting of lower alkyl, lower hydroxyalkyl, lower alkoxyalkyl and

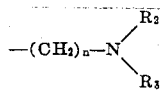

wherein n is 2–6 and $R_2$ and $R_3$ are lower alkyl having 1–6 carbon atoms.

Another object of the present invention is to provide new quaternary derivatives corresponding to the compounds of formula (I), when these compounds have a quaternizable tertiary amine function.

It should be noted that the compounds of formula (I) are particularly adapted to be used to dye keratinic fibers in general, and especially hair. They have an excellent affinity for keratinic fibers, good stability when exposed to light and inclement weather, and are readily soluble in water.

The compounds of formula (I) may be quaternized in a conventional manner, using a quaternizing agent such as methyl sulfate or an alkyl or aryl halide.

In order that the invention may be better understood, several examples of the compounds of formula (I) will now be described.

EXAMPLE 1

Preparation of N-methyl-parachlorometanitraniline by alkylation with arylsulfonamides.
First step: alkylation.

0.4 mol (125 g) of 2-nitro-4-benzenesulfonylamino chlorobenzene is dissolved in 600 cc of a normal sodium hydroxide solution at 30° C. 1.6 mols (125 cc) of methyl sulfate are added little by little, while keeping the temperature between 35° and 40° C and the pH value near 9 by successive additions of a normal sodium hydroxide solution. The reaction mixture is then left to stand for 6 hours at room temperature. Cooling, drying and washing then yields 138 g of crude 2-nitro-4-N-methyl-n-benzene sulfonylamino chlorobenzene which, after recrystallization in ethyl acetate, melts at 119° C. Analysis of this product shows the following results:

| Analysis | Calculated for $C_{13}H_{11}N_2ClSO_4$ | Found |
|---|---|---|
| C % | 47.78 | 47.86 – 47.89 |
| H % | 3.37 | 3.43 – 3.52 |
| N % | 8.57 | 8.27 – 8.46 |

Second step: Hydrolysis 0.168 mol (55.2g) of 2-nitro-4-(N-methyl,N-benzylsulfonyl)amino chlorobenzene is added little by little, to 275 cc of sulfuric acid at 0° C. When it is completely dissolved, the reaction mixture is left standing for 12 hours at room temperature, and then poured into two liters of ice water, after which it is alkalized with a 5 times normal solution of sodium hydroxide. Drying and washing with water yields 38.5 g of 2-nitro-4-N-methylamino chlorobenzene, which melts at 56° C. Analysis of the product yields the following results:

| Analysis | Calculated for $C_7H_7N_2O_2Cl$ | Found |
|---|---|---|
| C % | 45.08 | 44.87 – 44.96 |
| H % | 3.72 | 3.84 – 3.87 |
| N % | 15.01 | 15.15 – 15.25 |

EXAMPLE 2

Preparation of (N-methyl-N-acetyl)parachlorometanitraniline.

0.19 mol of N-methyl-parachlorometanitraniline, prepared as set forth in example 1, is dissolved in 70 cc of acetic anhydride. This is heated for 15 minutes in a boiling water-bath, and poured into 700 cc of water. Drying then yields 35 g of 2-nitro-4-(N-methyl-N-acetyl)amine chlorobenzene, which melts at 114° C.

EXAMPLE 3

Preparation of 1-γ-methoxypropylamino-2-nitro-4-(N-methyl-N-acetyl)-amino benzene.

0.1 mol (22.9 g) of (N-methyl-N-acetyl)para-chlorometanitraniline which has been prepared as described in Example 2, is introduced, while stirring, into 1.5 mols (134 g) of γ-methoxypropylamine which has first been heated to 95° C. This reaction mixture is kept at 95° C for 20 minutes, cooled and poured into 1.250 liters of ice water. This is acidified with hydrochloric acid, dried, and washing with water yields 25 g of 1-γ-methoxypropylamino-2-nitro-4-(N-methyl-N-acetyl)amino benzene which, after recrystallization, melts in toluene at 90° C. Analysis of this product yields the following results:

| Analysis | Calculated for $C_{13}H_{19}N_3O_4$ | Found |
|---|---|---|
| C % | 55.52 | 55.77 – 55.54 |
| H % | 6.76 | 6.85 – 6.83 |
| N % | 14.95 | 15.11 – 15.01 |

EXAMPLE 4

Preparation of 1-N-γ-hydroxypropylamino-2-nitro-4-(N-methyl-N-acetyl)-amino benzene.

0.1 mol (22.9 g) of 2-nitro-4-(N-methyl-N-acetyl)-amino chlorobenzene, prepared as described in Example 2 is introduced, while stirring, into 2 mols (150 g) of propanolamine, which has first been heated to 95° C. When this addition has been completed, the mixture is kept at 95° C for 10 minutes, cooled, and poured into 1.5 liters of ice water. It is then acidified with hydrochloric acid, whereupon drying and washing with water yields 25 g of 1-γ-hydroxypropylamino-2-nitro-4-(N-methyl-N-acetyl)-amino benzene which, after recrystallization in toluene, melts at 122° C. Analysis of this product yields the following results:

| Analysis | Calculated for $C_{12}H_{17}N_3O_4$ | Found |
|---|---|---|
| C % | 53.93 | 54.14 – 53.93 |
| H % | 6.37 | 6.37 – 6.54 |
| N % | 15.73 | 15.91 – 15.80 |

Several examples will now be given showing how the compounds of formula (1) are used in hair dyeing compositions.

EXAMPLE 5

The following composition is prepared:
1-N-β-diethylaminoethylamino-2-nitro-4N'-hydroxyethyl-amino benzene dihydrochloride—0.37 g
1-N-γ-hydroxypropylamino-2-nitro-4-(N-methyl-N-acetyl) amino benzene—0.26 g
Isooctylphenylpolyethoxyethanol—1.2 g
Na$_2$CO$_3$, q.s.p. — pH 8
Water, q.s.p. — 100 g This composition is applied to bleached hair and left thereon for 10 minutes. The hair is then rinsed and shampooed.

A copper mahogany color results.

EXAMPLE 6

The following composition is prepared:
1-N-γ-hydroxypropylamino-2-nitro-4-(N-methyl-N-acetyl)-amino benzene— 1.3 g
Isooctylphenylpolyethoxyethanol — 1.5 g
NH$_4$OH, q.s.p. — pH 9
Water, q.s.p. — 100 g This composition is applied to 100 percent white hair for 15 minutes. The hair is then rinsed and shampooed and a deep blonde shade results.

What is claimed is:

1. A compound of the formula

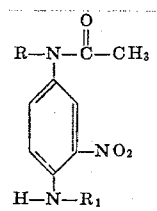

(I)

wherein R is alkyl having 1 – 6 carbon atoms and R$_1$ is selected from the group consisting of hydroxyalkyl and methoxyalkyl, wherein the alkyl moities have 1 – 6 carbon atoms.

2. 1-γ-methoxypropylamino-2-nitro-4-(N-methyl-N-acetyl)amino benzene.

3. 1-N-γ-hydroxypropylamino-2-nitro-4-(N-methyl-N-acetyl)amino benzene.

* * * * *

UNITED STATES PATENT OFFICE
CERTIFICATE OF CORRECTION

Patent No. 3,742,048          Dated June 26, 1973

Inventor(s) Gregoire KALOPISSIS, Andree BUGAUT and Vahan ZORAYAN

It is certified that error appears in the above-identified patent and that said Letters Patent are hereby corrected as shown below:

In the Heading -

Under [75] Inventors, change

"Kalopissis Gregoire" to --- Gregoire KALOPISSIS--

"Bugaut Andree" to --- Andree BUGAUT ---

"Zorayan Vahan" to --- Vahan ZORAYAN ---

Please insert:-

--- Claims priority, applications Luxembourg, May 16, 1967,

Nos. 53676, 53677 and 53678 ---

Signed and sealed this 17th day of September 1974.

(SEAL)
Attest:

McCOY M. GIBSON JR.          C. MARSHALL DANN
Attesting Officer              Commissioner of Patents